(12) United States Patent
Rump et al.

(10) Patent No.: US 6,735,311 B1
(45) Date of Patent: May 11, 2004

(54) ENCRYPTION AND DECRYPTION OF MULTI-MEDIA DATA

(75) Inventors: Niels Rump, Erlangen (DE); Jürgen Zeller, Ismaning (DE); Harald Popp, Tuchenbach (DE)

(73) Assignee: Fraunhofer-Gellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/171,820

(22) PCT Filed: Apr. 14, 1997

(86) PCT No.: PCT/EP97/01846

§ 371 (c)(1),
(2), (4) Date: Oct. 26, 1998

(87) PCT Pub. No.: WO97/50248

PCT Pub. Date: Dec. 31, 1997

(30) Foreign Application Priority Data

Jun. 26, 1996 (DE) .......................................... 196 25 635

(51) Int. Cl.⁷ ............................................. H04N 7/167
(52) U.S. Cl. ......................... 380/231; 380/201; 705/51; 705/52
(58) Field of Search ................................ 380/202, 231, 380/201; 705/58, 51, 52

(56) References Cited

U.S. PATENT DOCUMENTS

| 5,319,705 | A |   | 6/1994  | Halter et al. .................... 380/4 |
| 5,369,702 | A |   | 11/1994 | Shanton .......................... 380/4 |
| 6,011,847 | A | * | 4/2000  | Follendore, III ............... 380/4 |

FOREIGN PATENT DOCUMENTS

| EP | 0 714 207 A1 | 5/1996 | .......... H04N/7/173 |
| WO | WO 94/10802  | 5/1994 | .......... H04N/7/167 |
| WO | WO 96/11549  | 4/1996 | ............ H04N/7/60 |

OTHER PUBLICATIONS

Ulrich Reimers; "Digitale Fernsehtechnik—Digital Video Broadcasting"; Springer–Verlag, 1995; pp. 89–99 inclusive, and 171–176, inclusive (not translated).
Albrecht Ziemer; "Digitales Fernsehen"; R.v. Decker's Verlag, 1994; pp. 163–167, inclusive, pp. 200–205, pp. 262–264, inclusive, and p. 267 (not translated).
ISO/IEC 13818–1; "Information Technology—Generic Coding of Moving Pictures and Associates Audio: Systems, Recommendation H.222.0"; draft of 1540, Nov. 13, 1994; pp. ii–vii, inclusive, pp. xv and xvi, pp. 5 and 21, pp. 30–34, inclusive, and pp. 111–116, inclusive.
EBU Project Group B/CA; "Functional model of a conditional access system"; European Broadcasting Union; EBU Technical Review No. 266 (Winter 1995/6); pp. 1–15, inclusive.
TCM 70, Revision 1; "Common Conditional Access Interface Specification for Digital Video Broadcasting Decoder Applications"; Feb. 2, 1995; p. 7 and pp. 25–29, inclusive.
Forschung & Entwicklung; "Multimedia für unterwegs"; Funkschau, Mar. 15, 1996, No. 7; pp. 75–77, inclusive (not translated).

* cited by examiner

*Primary Examiner*—Gail Hayes
*Assistant Examiner*—James Seal
(74) *Attorney, Agent, or Firm*—Glenn Patent Group; Michael A. Glenn

(57) ABSTRACT

A method for ciphering multimedia includes the entering of an ciphering index in a definition data block of the multimedia data, this index pointing to an ciphering algorithm which is to be used. In response to the ciphering index in the definition data block one of a plurality of ciphering algorithms is selected. The multimedia data are ciphered using the selected ciphering algorithm. Various additional entries in the definition data block which is assigned to the multimedia data permit the clearing or enabling of a deciphering device, rapid access to a database of ciphered multimedia data and a customer- and data-specific use of the multimedia data while taking copyright aspects into account.

28 Claims, 3 Drawing Sheets

| NAME OF ENTRY | SIZE | NAME OF SUBENTRY | SIZE | CIPHERED? |
|---|---|---|---|---|
| FILE INDEX | 4 BYTE | IDENTIFIER | 24 BIT | NO |
|  |  | VERSION | 8 BIT |  |
| LENGTH INDEX | 4 BYTE | DEFINITION DATA BLOCK LENGTH | 32 BIT | NO |
| OFFSET INDEX | 4 BYTE | OFFSET | 32 BIT | NO |
| CIPHERING INDEX | 4 BYTE | METHOD | 16 BIT | NO |
|  |  | KEY | 16 BIT |  |
| VARIABLE PART OF THE DEFINITION DATA BLOCK (SEE FIG.2) | | | | |
| CHECKSUM | 16 BYTE | MD5-FINGERPRINT | 128 BIT | YES |

| | NAME OF ENTRY | SIZE | NAME OF SUBENTRY | SIZE | CIPHE-RED? |
|---|---|---|---|---|---|
| 12 | FILE INDEX | 4 BYTE | IDENTIFIER | 24 BIT | NO |
| | | | VERSION | 8 BIT | |
| 14 | LENGTH INDEX | 4 BYTE | DEFINITION DATA BLOCK LENGTH | 32 BIT | NO |
| 16 | OFFSET INDEX | 4 BYTE | OFFSET | 32 BIT | NO |
| 18 | CIPHERING INDEX | 4 BYTE | METHOD | 16 BIT | NO |
| | | | KEY | 16 BIT | |
| | VARIABLE PART OF THE DEFINITION DATA BLOCK (SEE FIG.2) | | | | |
| 20 | CHECKSUM | 16 BYTE | MD5-FINGERPRINT | 128 BIT | YES |

*FIG.1*

| | ID | NAME OF ENTRY | SIZE | NAME OF SUBENTRY | SIZE | CIPHE-RED? |
|---|---|---|---|---|---|---|
| 32 | 0x01 | BLOCK SIZE INDEX | 8 BYTE | STEP | 16 BIT | NO |
| | | | | AMOUNT | 16 BIT | |
| 34 | 0x02 | PROVIDER INDEX | 8 BYTE | PROVIDER | 32 BIT | NO |
| 36 | 0x03 | DISTRIBUTOR INDEX | 8 BYTE | DISTRIBUTOR | 32 BIT | NO |
| 38 | 0x04 | USER INDEX | 8 BYTE | USER | 32 BIT | NO |
| 40 | 0x05 | FLAG INDEX | 8 BYTE | SECRET | 1 BIT | NO |
| | | | | REGISTRATION | 1 BIT | |
| | | | | CHALLENGE | 1 BIT | |
| 42 | 0x06 | FREE INDEX | 20 BYTE | SERIAL NUMBER | 32 BIT | YES |
| | | | | USER DATA | 96 BIT | |
| 44 | 0x07 | CHALLENGE INDEX | 20 BYTE | DECODER TYPE | 4 BIT | YES |
| | | | | DECODER VERSION | 4 BIT | |
| | | | | DECODER STATUS | 8 BIT | |
| | | | | DISTRIBUTOR INDEX | 32 BIT | |
| | | | | USER INDEX | 32 BIT | |
| | | | | USER DATA | 46 BIT | |
| 46 | 0x08 | RESPONSE INDEX | 20 BYTE | RESPONSE INDEX | 128 BIT | YES |
| 48 | 0x09 | EXPIRY INDEX | 8 BYTE | EXPIRY DATE | 32 BIT | NO |
| 50 | 0x0a | MULTIMEDIA INDEX | 16 BYTE | COUNTRY CODE | 16 BIT | NO |
| | | | | OWNER CODE | 24 BIT | |
| | | | | YEAR | 16 BIT | |
| | | | | DESIGNATION CODE | 40 BIT | |
| 52 | 0x0b | USER CODE INDEX | 16 BYTE | USER CODE | 96 BIT | NO |

*FIG.2*

| NAME OF ENTRY | SIZE | NAME OF SUBENTRY | SIZE | CIPHERED? |
|---|---|---|---|---|
| ENTRY | 4 BYTE | ENTRY IDENTIFICATION<br>ENTRY LENGTH | 8 BIT<br>24 BIT | NO |

54

|  | BLOCK SIZE INDEX 32 | PROVIDER INDEX 34 | DISTRIBUTOR INDEX 36 | USER INDEX 38 | FREE INDEX 42 | CHALLENGE INDEX 44 | RESPONSE INDEX 46 | EXPIRY DATE 48 |
|---|---|---|---|---|---|---|---|---|
| UNCIPHERED BIT STREAM | | | | | | | | |
| CIPHERED BIT STREAM WITH DEMO PLAYER (CLEARING) | X | | | | X | | | |
| CIPHERED BIT STREAM FOR USERS OF A SPECIFIC DISTRIBUTOR (DEMO PLAYER, CLEARING) | X | | X | | X | | | |
| CIPHERED BIT STREAM FOR ALL USERS OF A SPECIFIC PROVIDER | X | X | X | | | | | (X) |
| CIPHERED BIT STREAM FOR ONE USER OF A SPECIFIC PROVIDER | X | X | X | X | | | | (X) |
| CIPHERED BIT STREAM FOR ONE USER OF A SPECIFIC PROVIDER (FAST DATABASE ACCESS) | X | X | X | X | | X | X | (X) |

*FIG.5*

ENCRYPTION AND DECRYPTION OF MULTI-MEDIA DATA

FIELD OF THE INVENTION

The present invention refers to the ciphering and deciphering of multimedia data and in particular to the ciphering and deciphering formats which can be used e.g. in the commercial marketing of multimedia data.

BACKGROUND

With the appearance of telecommunication networks and in particular because of the widespread use of personal computers capable of handling digital multimedia data, a need arose for the commercial marketing of multimedia data, such as e.g. digital audio data or digital video data. The telecommunication networks may e.g. be analog telephone lines, digital telephone lines, such as ISDN e.g., or also the Internet. On the part of commercial providers of multimedia products there is the need to sell or hire out multimedia data in such a way that a customer should be able to choose a certain product individually from a certain catalogue at any time, only the customer who pays for it being able to use the product of course.

In contrast to the known ciphered television programmes, such as e.g. the television channels Premiere or MTV, where the broadcast data are ciphered identically for all users, who have acquired a suitable deciphering device for an appropriate fee, the present invention provides methods and devices which make possible an individual, customer-selective ciphering and deciphering of multimedia data. In contrast to the cited television channels, which offer a fixed programme which the user must accept or reject in its entirety, the methods and devices of the present invention offer the customer a maximum freedom of choice, i.e. he must only pay for those products which he has actually used.

U.S. Pat. No. 5,369,702 discloses a system for increasing the security of a computer system in which individual users can utilize the system flexibly and efficiently. The method disclosed in this publication comprises the steps of accessing an object-oriented key administrator, selecting an object to be ciphered, selecting a label for the object, selecting an ciphering algorithm, ciphering the object according to the ciphering algorithm, labelling the ciphered object, reading the object label, determining an access authorization on the basis of the object label and deciphering the object if the access authorization is granted. A file "label" consists of a series of letters or numbers, which may be ciphered or not ciphered. This file label is separate from a message but is assigned to the transmission of the message, the label also identifying the person, position, equipment and/or organization entitled to receive the assigned message, i.e. the multimedia data.

U.S. Pat. No. 5,319,705 relates to a method and a system for the secure distribution of a plurality of software files from a software distribution processor to a user processor, while the user processor is selectively enabled to use only a subset of a smaller plurality of software files. This is achieved by using a customer key having an unciphered customer key and a derived section which is derived from the customer number.

It is the object of the present invention to provide methods and devices for ciphering and deciphering multimedia data which, on the one hand, guarantee an effective copyright protection, and which, on the other, are capable of ciphering and deciphering individually requested data flexibly.

SUMMARY OF THE INVENTION

According to a first aspect of the present inventions method for ciphering multimedia data to obtain an ciphered multimedia file having a definition data block and a multimedia data block, comprising the steps of entering a definition data ciphering index in the definition data block which points to a definition data ciphering algorithm to be used for ciphering a section of the definition data block; entering a multimedia data ciphering index in the definition data block which points to a multimedia data ciphering algorithm to be used for ciphering at least part of the multimedia data block; entering a free index in the definition data block, the free index identifying a particular deciphering device with which the ciphered multimedia data can be deciphered beyond a specified period of time; selecting the definition data ciphering algorithm from a plurality of ciphering algorithms on the basis of the definition data ciphering index; selecting the multimedia data ciphering algorithm from a plurality of ciphering algorithms on the basis of the multimedia data ciphering index; ciphering the section of the definition data block with the definition data ciphering algorithm, the section of the definition data block not including the definition data ciphering index; and at least partially ciphering the multimedia data block with the multimedia data ciphering algorithm.

According to a second aspect of the present invention a method for deciphering multimedia data contained in a multimedia file having a definition data block and a multimedia data block, the definition data block including a definition data ciphering index, a multimedia data ciphering index, and a free index, comprises the steps of reading the definition data block; selecting a definition data deciphering algorithm from a plurality of deciphering algorithms on the basis of the definition data ciphering index; selecting a multimedia data deciphering algorithm from a plurality of deciphering algorithms on the basis of the multimedia data ciphering index; deciphering the ciphered section of the definition data block using the definition data deciphering algorithm; and deciphering the multimedia data block using the selected multimedia data deciphering algorithm, wherein the step of deciphering the multimedia data block is only continued beyond a specified period of time if the device for deciphering has a setting which is appropriate for the free index.

According to a third aspect of the present invention a device for ciphering multimedia data to obtain a ciphered multimedia file having a definition data block and a multimedia data block, comprises means for entering a definition data ciphering index in the definition data block, the definition data ciphering index pointing to a definition data ciphering algorithm to be used for ciphering a section of the definition data block; means for entering a multimedia data ciphering index in the definition data block, the multimedia data ciphering index pointing to a multimedia data ciphering algorithm to be used for ciphering at least part of the multimedia data block; means for entering a free index in the definition data block, the free index identifying the device for deciphering with which the ciphered multimedia data can be deciphered beyond a specified period of time; means for selecting the definition data ciphering algorithm from a plurality of ciphering algorithms on the basis of the definition data ciphering index; means for selecting the multimedia data ciphering algorithm from a plurality of ciphering algorithms on the basis of the multimedia data ciphering index; means for ciphering the section of the definition data block with the definition data ciphering algorithm, the section of the definition data block not including the definition data ciphering index; and means for at least partially ciphering the multimedia data block with the multimedia data ciphering algorithm.

According to a fourth aspect of the present invention a device for deciphering multimedia data contained in a multimedia file having a definition data block and a multimedia data block, the definition data block including a definition data ciphering index, a multimedia data ciphering index, and a free index, comprises: means for reading the definition data block; means for selecting a definition data deciphering algorithm from a plurality of deciphering algorithms on the basis of the definition data ciphering index; means for selecting a multimedia data deciphering algorithm from a plurality of deciphering algorithms on the basis of the multimedia data ciphering index; means for deciphering the ciphered section of the definition data block using the definition data deciphering algorithm; and means for deciphering the multimedia data block using the selected multimedia data deciphering algorithm, wherein the device for deciphering the multimedia data only continues to decipher the multimedia data block beyond a specified period of time if the device has a setting which is appropriate for the free index.

The present invention is based on the finding that an adequate copyright protection for audio and video products in the form of digital multimedia data can be guaranteed only if a secure ciphering is performed as immediately as possible after the production of the digital multimedia data, which e.g. are coded or compressed according to the known Standard MPEG Audio Layer 3. For persons skilled in the art it is obvious that the present invention is not confined to the use of data in the MPEG Layer 3 format but that also uncompressed multimedia data or multimedia data which have been compressed according to some other method can be used as well.

After the multimedia data have been ciphered by an ciphering device prior to storing/filing them, they can be requested individually by a user who is in possession of a suitable deciphering device. Only for the accomplishment of its objectives, however, may this deciphering device annul the ciphering protection surrounding the data, it being of great importance also that not every deciphering device is capable of reading the multimedia data but only the deciphering device of the customer who has paid for the multimedia data. It is also important that it should be made as difficult as possible if not impossible for the user to make unauthorized changes in the multimedia data themselves or in the ciphering.

If a user should attempt to change the multimedia data, it is preferable that the data should be completely unreadable. The fact that the ciphering device already generates ciphered files at its output, spreads the protection over the multimedia data practically at once, therefore guarantees that no unprotected data appear at the start of a transmission/storage chain.

The deciphering device is able to read the specially ciphered data. The method for ciphering multimedia data according to the present invention generates, in addition to the existing unciphered multimedia data, a definition data block which contains various items of information concerning the ciphering of the unciphered multimedia data and concerning general and special functions which can be performed by the present invention.

Some of the functionalities required of a deciphering device according to the present invention will now be described:

A deciphering device of the present invention should be able to implement a demo playback unit for audio data, which may be e.g. in the ISO/MPEG Layer 3 format, which only permits the first 20 seconds or so of an audio recording to be played back. In special circumstances it should also be possible for the demo playback unit to play back certain pieces of music for longer than 20 seconds for a particular customer. This is achieved by a so-called clearing or releasing of the bit stream, which is effected by means of certain entries in the definition data block.

Furthermore, the present invention should be able to implement a deciphering device, i.e. a playback unit, for audio data in the MPEG Layer 3 format, which allows only certain customers to play back a certain audio file. This contributes to the copyright protection for audio or video works, for which a playback should only be possible after payment of a fee.

In addition the present invention should implement a player which can not only play back the contents of an audio data file but which can also display certain supplementary information. This supplementary information (i.e. meta data) can be information on the artist, the playback time, and further information on the audio recording or e.g. also a picture of the record/CD sleeve.

An ciphering device according to the present invention is able to cipher multimedia data efficiently and securely. In addition the present invention implements a special functionality called the challenge-response method, which will be described in detail later.

This method permits the creation of pre-ciphered audio data, which are stored in a database which can be accessed very quickly by a customer, who uses a private key which is derived from the key actually used for ciphering the data, the customer being able, using his private key and his user index, to calculate for himself the key actually used for ciphering the data, whereupon the multimedia data which have been retrieved can be deciphered, e.g. to play them back.

As a result it is possible that for a large number of customers who retrieve the same piece, the piece need not be fully ciphered each time for each individual customer but that the data can be ciphered identically for all customers, each customer being able, however, to calculate for himself the key actually used by employing his private key and a response key disclosed by the ciphering device.

In the challenge-response method the individual ciphering for each individual user is therefore achieved not by means of a completely new ciphering of the multimedia data but simply by means of a comparatively small change in the definition data block, which in accordance with the present invention is appended to the multimedia data.

The ciphering according to the present invention thus creates a file format for the protection of multimedia data which is used in the deciphering according to the present invention in order e.g. to implement the functionalities described above.

BRIEF DESCRIPTION OF THE DRAWINGS

A preferred embodiment of the present invention will now be described in more detail making reference to the enclosed drawings, in which FIG. 1 shows a fixed part of a definition data block;

FIG. 2 shows a variable part of a definition data block;

FIG. 5 shows an overview of definition data block entries needed for individual functionalities.

DETAILED DESCRIPTION

Figures 3, 4:
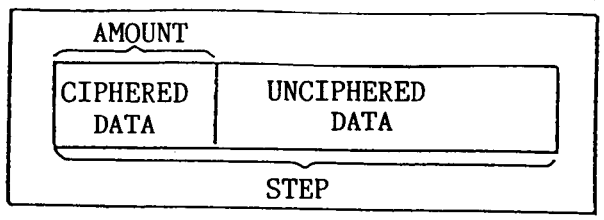
FIG. 3 shows a partitioning of multimedia data into ciphered data and unciphered data.
FIG. 4 shows an envelope block for the various entries in the variable part of the definition data block.

Each multimedia protection file (MMP file), which essentially can be a data stream having a beginning and an end, is accompanied by a special MMP definition data block or MMP "header". This definition data block can appear at the beginning of a multimedia file or also anywhere in the MMP file. In a preferred embodiment of the present invention a definition data block should, however, be present at the beginning of a multimedia file. The format of this definition data block will now be discussed.

The definition data block consists of two parts, namely a fixed part 10, which is shown in FIG. 1, and a variable part 30, which is shown in FIG. 2. The fixed part 10 of the definition data block, which consists of 10 and 30, contains, generally speaking, minimal information, such as e.g. information as to how the definition data block is ciphered, how long it is and where a potentially present next definition data block is to be found. The entries in the fixed part of the definition data block (10, 30) will now be described individually.

In the table shown in FIG. 1 the first column indicates the name of the respective entry, the second column the size of the same, the third column the name(s) of possible subentries, the fourth column the respective size of the individual subentries, whereas the last column of the table in FIG. 1 indicates whether the entry, i.e. the subentries assigned to the same, are ciphered or not.

The first line 12 contains a file index, with an identifier relating to a specific MMP file and a version number of the same as subentries. In line 14 there is a length index which indicates the length of the definition data block. This entry serves e.g. to jump over the definition data block or also for simpler parsing. In line 16. an offset index indicates the offset from one definition data block to a next definition data block, where the same is useful for jumping from one definition data block to the next definition data block when there are e.g. several definition data blocks in a single MMP file without having to check the file index for compatibility each time.

A line 18 of the table in FIG. 1 contains an ciphering index, which is an index for a table of ciphering and deciphering algorithms, which are used to render critical parts of the definition data block illegible for non-authorized users or programs. In an implementation of the present invention 65,535 different ciphering algorithms, which are filed in a copyright protection library, which must be available both in the ciphering device and also in the deciphering device according to the present invention, can be used. Access to one of these 65,535 different ciphering algorithms is achieved via the first two bytes (i.e. via the first subentry Method). The second subentry Key provides an index for a table in which a set of ciphering keys or keys for each ciphering algorithm can be stored. This table of keys for each individual ciphering algorithm must also be available both in the ciphering device and in the deciphering device of the present invention.

In the present invention a so-called symmetrical ciphering method is thus used for ciphering and deciphering, which means that both the ciphering device and the deciphering device must be in possession both of the ciphering methods and also in particular of the keys themselves. For implementing the present invention it would, however, also suffice simply to determine the ciphering algorithm in the ciphering index 18. In this case the key itself could e.g. be specified. This embodiment would, however, provide less protection than the embodiment with algorithm and key just described.

In this description the term "ciphering algorithm" is accordingly used in such a way that it denotes both an ciphering algorithm which employs no key or a rigidly specified known key and also an ciphering algorithm which requires a key in order to perform an ciphering or deciphering. An ciphering algorithm with a key A can thus be a first ciphering algorithm in the sense of this description, while the same ciphering algorithm with a key B is a second ciphering algorithm in the sense of this description which differs from the first ciphering algorithm.

In a preferred embodiment of the present invention a certain part of the definition data block, as is explained later, is ciphered using the algorithm and key described in the entry Ciphering index 18. The entry Ciphering index 18 thus provides the definition data ciphering algorithm.

The key selected in the subentry Key is also (until the next definition data block in the data stream) used as the basis for ciphering multimedia data so as to obtain a multimedia data. block which is assigned to the definition data block.

In a preferred embodiment of the present invention this basis key is linked with a provider index 34, with a distributor index 36 or with a user index 38 by means of an EXCLUSIVE OR linkage so as to obtain the key for the ciphering of the multimedia data, i.e. in the sense of this description the multimedia data ciphering algorithm. If none of the entries 34 to 38 is present, the multimedia data are ciphered directly using the "basis key" from the entry Ciphering index 18. If fewer of the entries 34–38 than possible are present, those that are present are utilized for the EXCLUSIVE OR linkage with the "basic key" so as to obtain the multimedia data ciphering algorithm.

The entry 18 in the definition data block is followed by the variable part 30 of the definition data block, which is shown in FIG. 2 and which will be described later. The variable part of the definition data block is followed by a final entry 20, which is called the checksum. This checksum consists of a so-called MD5 fingerprint, which is described in more detail in RFC1321. To aid understanding of the present invention it will, however, be explained briefly. MD5 is an algorithm which represents an arbitrary number of data bytes as a digit with a length of 128 bits (=16 bytes). The MD5 representation (MD5 =message digest 5) has the property that even the smallest change in the input data creates a completely different MD5 digit. Thus, MD5 is used to create a fingerprint of fixed size from data of arbitrary length. In one embodiment of the present invention e.g. the entry Checksum 20 contains an MD5 fingerprint of the definition data block (10, 30). In a different embodiment the entry Checksum 20 might e.g. contain both the definition data block and also a specified number of multimedia data to be ciphered to which the described definition data block is assigned. As a result the entry 20 defines the assignment of a definition data block to the multimedia data in a unique and manipulation-proof way (furthermore the entry 20 is also ciphered).

All the entries in the definition data block, i.e. also the entries of the variable part of the definition data block described hereafter, are in the so-called "big endian" byte sequence. "Big endian" signifies a transmission/storage in which the highest value byte is transmitted/stored first. An example should make this clear. A date e.g. encompasses 4 bytes, i.e. its value is 0x56fe4321. According to the "big endian" byte sequence, 0x56 will be transmitted/stored first, followed by 0xfe, 0x43 and 0x21.

As has already been stated, a tabular representation of the variable part 30 of the definition data block is shown in FIG. 2. The first column of the table in FIG. 2 denotes an identification number (ID) of the individual entries. The second column contains the name of the entry, the size of which is given in the third column. The fourth column again shows, analogously to the table in FIG. 1, the name of the single subentry or potentially several subentries, the size of which is again given in the last column but one. The last column indicates, just as in FIG. 1, whether the individual entry is ciphered or not.

The variable part 30 of the definition data block contains, inter alia, information concerning the copyright ciphering of the audio bit stream, i.e. of the multimedia data. The entries in the variable part of the definition data block and their functions or tasks will now be described in detail.

Line 32 contains a block size index, which consists of two subentries, namely step and amount. The first subentry Step indicates, as shown in more detail in FIG. 3, the total amount of multimedia data which are assigned to the specific definition data block, provided the multimedia data file has only one definition data block. If a definition data block is followed by several multimedia data blocks, the definition data block has several block size indexes, each of which relates to its own particular multimedia data block. In order to be able to store or transfer multimedia data simply, it is advisable to subdivide the multimedia data, i.e. the bit stream, into separate data blocks or multimedia files of manageable length to which a definition data block is then assigned. This means that a piece of music e.g. has several definition data blocks which may possibly denote several ciphering algorithms used for a single piece of music. Also, a single definition data block in a multimedia file may be followed by several multimedia data blocks, as explained above.

Based on the fact that for an embodiment of the present invention the audio data exist in the MPEG Layer 3 format, which already results in a high compression of the audio data, it suffices in terms of an efficient, time-saving implementation of the present invention to cipher just a certain part of a data block which is assigned to a definition data block and not to cipher the whole block. This can be done because, when highly compressed multimedia formats are used, even a very small number of intrusions, i.e. cipherings, has grave consequences, since the highly compressed data already possess minimal information redundancy. This ciphered data part is denoted by the subentry Amount in the block size index 32. FIG. 3. therefore shows the partition of a data block into the ciphered data and into the data which, for economic reasons, are left unciphered. It is pointed out here that the smallest amount of data which can be ciphered or deciphered by an ciphering or deciphering algorithm must be exactly divisible by the subentry Step in order to guarantee a correct ciphering or deciphering. To persons skilled in the art it is, however, obvious that the present invention can equally well also perform a complete ciphering, for which the step is equal to the amount, whereas for a partial ciphering the step is greater than the amount.

A line 34 in the table in FIG. 2 denotes a provider index, the provider index having a numerical value which indicates the owner of the copyrights to the multimedia data ciphered in the data block to whom payment must be made for the use of the multimedia data in the data block.

An entry 36 with the name Distributor index contains a numerical value which denotes the distributor of the multimedia data in the data block.

Line 38 of the table in FIG. 2 contains a user index which indicates the customer/user to whom the multimedia data in the data block have been transmitted, e.g. sold or hired out.

The flag index 40 contains any number of flags, three such flags, which have been called Secret, Registration and Challenge, being used in a preferred embodiment of the present invention. The flag Secret indicates that the distributor index is to be used for ciphering the data. When this flag is set, the ciphering/deciphering method will use the distributor index as an entry to a direct-access table in order to obtain the key required for a particular ciphering/deciphering algorithm. This entry makes possible a distributor-specific identification of multimedia data, i.e. a customer/user will e.g. be able to procure all the products of a specific distributor.

The flag Registration indicates that both the distributor index and the user index are to be used for the ciphering. The ciphering/deciphering method will use this pair (distributor index, user index) when addressing a direct-access table, whereby the key for a special ciphering algorithm can be obtained. This flag, in conjunction with the respective entries, permits a distributor to serve individual users on a specific basis.

The challenge flag indicates that the customer has used a challenge index 44 and his user index to receive an MMP file, the challenge index 44 and a response index entry 46 in the variable part of the definition data block being ciphered. A detailed description of the challenge-response method according to the present invention will be presented later. Even when not all the 32 possible flags are used, the full length of 4 bytes must be written, sent and read in one embodiment of the present invention. All the unused bits are ignored; they must, however, be set to 0. It is also possible to send all 3 flags. In this case all 3 keys are used, namely one after the other in the sense of a Boolean EXCLUSIVE OR linking of the three keys.

A line 42 of the table of FIG. 2 contains a free index. This free index 42 contains two subentries, namely the serial number and user data. The subentry Serial number contains a 32-bit long serial number which identifies the multimedia data. The subentry User data, i.e. the next 96 bits of the entry Free index 42, is filled with the first 12 bytes of the MD5 fingerprint of the first data of the multimedia data block from Amount to Step minus Amount.

The complete entry Free index 42 in the variable part of the MMP definition data block is ciphered, as shown in the last column in FIG. 2. Furthermore, the checksum 20 of the definition data block is itself ciphered, i.e. no unauthorized person will be in a position to create an MMP definition data block with a specific MD5 fingerprint. The free index 42 thus provides an unequivocal assignment of the definition data block (10, 30) to the ciphered or also unciphered multimedia data. When a reproduction, i.e. a deciphering, is enacted, a check is made to see whether the MD5 number calculated from the multimedia data agrees with the MD5 number in the subentry User data. Since every change in the multimedia data almost inevitably produces a change in the MD5 number of these data, it can be assumed that the data to be protected have not been changed if the two MD5 numbers are the same.

The free index 42 is used for the clearing method mentioned at the start, which can implement a demo player (a demo deciphering device). The subentries Serial number and User data in the free index 42 are combined using the Boolean linkage XOR and compared with a value which is used by the demo player, i.e. to which the demo player has been set or adjusted. If this value agrees with the combination of serial number and user data, the MMP file is cleared and can be played for longer than 20 seconds or so. If this agreement does not exist, the demo player is not cleared, and so the player terminates the playback, i.e. the deciphering, of the multimedia data in the MMP file. The clearing itself thus serves to modify a product which is used for reproduction, i.e. the deciphering device. A deciphering device which can implement the present invention is e.g. "WinPlay3". The deciphering device may e.g. be obtainable free by all users as a demo version. It will, however, be restricted to reproducing multimedia data with a length of e.g. 20 seconds. As soon as an MMP bit stream with a valid free index 42 is recognized, however, the deciphering device is cleared. The deciphering device thus constitutes a full version without restriction for the reproduction of an MMP file with a valid free index 42. The clearing by means of the free index 42 thus has nothing to do with payment for the protected multimedia data but only with the use of a demo version of the deciphering device. The point is that for technical and political reasons it is often simpler if the deciphering device as such is not paid for in its entirety but the distributor or provider who has coded the free index 42 pays a small sum per multimedia file for the use of the deciphering device.

Lines 44 and 46 of the table in FIG. 2 contain the challenge index and the response index, respectively. The challenge index 44 has as subentries the decoder type (deciphering device type), the decoder version, the decoder status, the distributor index, the user index and user data. Both the challenge index 44 and the response index 46 are ciphered.

The challenge-response method can be used to create a large database of MMP files containing multimedia data. The MMP database consists of MMP files which have been ciphered with a key k which is denoted in the subentry Key in the ciphering index 18. A customer will access this database by sending two auxiliary keys to it. These two auxiliary keys are the user index u 38 and a user-defined private key p, which is also called the challenge index 44. The customer thus possesses the auxiliary key u and the auxiliary key p, i.e. these keys are present in a specific deciphering device. The customer then sends the two auxiliary keys u and p to a database, which contains a plurality of MMP files, in order to retrieve particular multimedia data from it. The database containing the multimedia data then sends an MMP file, which contains the response index r 46, back to the customer. This response index r is calculated from the EXCLUSIVE OR linkage of the key k, the user index u and the challenge index p. The customer's deciphering device then receives the MMP file from the ciphering device that can hold the MMP database, this file containing the response index 46 which has just been calculated. The deciphering device is now able to calculate for itself from the EXCLUSIVE OR linkage of the response index r, the user index u and the challenge index p the key k needed for the deciphering of the multimedia data. The key k is thus available in the customer's/user's deciphering device, so this can decipher the multimedia data assigned to the definition data block.

In a further embodiment of the present invention the parameters "u" and "p" are not directly the keys for an ciphering algorithm but they serve as entry values for a table in which the actual keys which are to be used for ciphering and deciphering are stored. The parameters "u" and "p" thus select the keys to be used.

The background for the implementation of the challenge-response method lies in an efficient and time-saving ciphering and deciphering. An ciphering device has protected multimedia data using a key k (ciphering index 18., subentry Key) and an algorithm a (ciphering index 18, subentry Method). These multimedia data are fed into an MMP database together with k and a. If now e.g. 1000 customers wish to acquire these multimedia data, the protected copy of the multimedia data would, without the challenge-response method, have to be deciphered 1000 times and ciphered again for a specific customer. With the challenge-response method a challenge index 44 which depends on a specific deciphering device is now entered, together with the response index 46 resulting from it, in the MMP definition data block. The complete data stream of the multimedia data does not therefore have to be changed for each customer individually. It is easier to create a response index 46 from a challenge index 44 1000 times, say, and enter this in the definition data block than to decipher the complete MMP file 1000 times and to cipher it again for each customer.

A line 48 of the variable part of the definition data block contains an expiry index indicating the date on which the user's licence to use multimedia data will expire. This index is e.g. given in seconds which have passed since midnight on Jan. 1, 1970. It is pointed out that the range of the expiry index will suffice up to about the year 2106. Even when this index is not ciphered it will be difficult to change it since the expiry index too will change the checksum 20 (the MD5 fingerprint) of the definition data block; furthermore, the checksum itself is ciphered as well.

A line 50 contains a multimedia index, which in a preferred embodiment can be an ISRC code (ISRC =International Standard Record Code). This multimedia index identifies each individual piece of music according to an internationally recognized standard. The ISRC code also identifies the owner, i.e. the provider in the sense of this patent application, of the piece of music, who possesses the copyrights. Finally, there is provision in a line 52 for a user code index, which is used to identify a piece of music which does not have an ISRC code, i.e. lacks a generally valid multimedia index.

To persons skilled in the art it is obvious that the definition data block, in particular the variable part of the definition data block, can be expanded at will, in order e.g. to transmit further meta information, such as information on the performer or artist for multimedia data, together with the multimedia file and, if required, to cipher the meta information. In one preferred embodiment of the present invention each of the entries 32 to 52 in the variable part 30 of the definition data block is preceded by an envelope block 54, which is shown in FIG. 4. This envelope block provides information as to which entry in the variable part 30 of the definition data block follows it (entry identification) and also information on the length of this particular entry (entry length). The size of each envelope block is 4 bytes. This is the reason why the number of bits in the penultimate column of the table shown in FIG. 2 is always 4 bytes shorter than the number of bytes shown in the third column.

As has already been mentioned, the last column of table 1 and of table 2 indicates whether the corresponding entry is ciphered. The only entries in the variable part of the definition data block which are ciphered are the free index 42, the challenge index 44 and the response index 46. All the unciphered entries are, however, protected by the entry Checksum 20 in the fixed part 10 of the definition data block since, on the one hand, the checksum is ciphered and, on the other, the use of the MD5 algorithm ensures that even a small change in the input produces a substantial change in the result delivered by the algorithm.

For persons skilled in the art it is obvious that e.g. nearly all entries or more or less entries than in the preferred embodiment described can also be ciphered. Limiting the data to be ciphered to the number needed to provide adequate protection, however, results in an economical implementation of the present invention, as has also been described in connection with the entry Block size index 32, since it is not necessary to cipher all the multimedia data or the whole definition data block but only parts of them so as to render the unauthorized reading of all the data impossible. Furthermore, it is obvious to persons skilled in the art that there is no point in ciphering the ciphering index 18 itself since the deciphering device must first read this entry in order to obtain the algorithm and potentially the key for the algorithm for the deciphering.

FIG. 5 depicts some of the important features of the present invention in a summarized form in the first column and also the entries which these entail in the variable part 30 of the definition data block. A deciphering device according to the present invention should, of course, also be capable of reading an unciphered bit stream, in which case all of the entries in FIG. 5 can be dispensed with. If an ciphered bit stream is to be used in conjunction with a demo player, which implements the clearing function that has been described, the definition data block of the ciphered multimedia data must at least include the free index 42.

As has already been mentioned, the block size index 32 is only necessary for an efficient implementation of the method according to the present invention. If a distributor wishes to serve all his customers with his products in the same way, the distributor index 36 in the definition data block of the multimedia data must be filled in. Optionally the free index 42 may be present in order to allow only particular users to play back particular pieces of music.

If all users are to have the opportunity of enjoying the works of a particular provider (i.e. the owner of the copyrights), the provider index and the distributor index can be filled in. optionally an expiry date 48 can also be entered.

If only one user should be able to access a particular piece of music, the user index 38 must be entered in the definition data block (10, 30) in addition to the provider index 34 and the distributor index 36.

Finally, if the challenge-response method which has been described is to be employed, which provides speedy access to a large database of MMP multimedia files, then the entries Challenge index 44 and Answer index 46 must of course be filled in. For persons skilled in the art it is obvious that the clearing by the free index 42 for a demo player and e.g. the challenge-response method can be combined at will.

The ciphering and deciphering according to the present invention thus provide a possibility of protecting multimedia data from unauthorized access immediately after they have been created, the complete chain from creator to consumer including storage being covered. The present invention is characterized in particular by the possible features of partial ciphering, expandability, i.e. the variable part of the definition data block can accommodate any further functions, the maximum security against falsification (i.e. the checksum 20) and the ciphering of certain entries in the definition data block. In this way both protection against an unauthorized use of multimedia data and an efficient implementation of the present invention through the use of the challenge-response concept are achieved.

What is claimed is:

1. A method for ciphering multimedia data to obtain an ciphered multimedia file having a definition data block and a multimedia data block, comprising the following steps:

entering a definition data ciphering index in the definition data block which points to a definition data ciphering algorithm to be used for ciphering a section of the definition data block;

entering a multimedia data ciphering index in the definition data block which points to a multimedia data ciphering algorithm to be used for ciphering at least part of the multimedia data block;

entering a free index in the definition data block, the free index identifying a particular deciphering device with which the ciphered multimedia data can be deciphered beyond a specified period of time;

selecting the definition data ciphering algorithm from a plurality of ciphering algorithms on the basis of the definition data ciphering index;

selecting the multimedia data ciphering algorithm from a plurality of ciphering algorithms on the basis of the multimedia data ciphering index;

ciphering the section of the definition data block with the definition data ciphering algorithm, the section of the definition data block not including the definition data ciphering index; and at least partially ciphering the multimedia data block with the multimedia data ciphering algorithm.

2. A method according to claim 1, wherein the definition data block is written into a file before the multimedia data block.

3. A method according to claim 1, further comprising the following step:

entering a block size index in the definition data block which, from the totality of the multimedia data in the multimedia data block, indicates part of the multimedia data to be ciphered, whereby only that part of the multimedia data denoted by the block size index will be ciphered by means of the multimedia data ciphering algorithm.

4. A method according to claim 1, further comprising the following step:

entering a provider index in the definition data block which indicates the provider who holds the copyrights for the multimedia data.

5. A method according to claim 1, further comprising the following step:

entering a distributor index in the definition data block which indicates the distributor offering the multimedia data.

6. A method according to claim 1, further comprising the following step:

entering a user index in the definition data block which indicates the user to whom the multimedia data are to be delivered.

7. A method according to claim 6, further comprising the following step:

entering a challenge index and a response index in the definition data block, wherein the challenge index and the user index are used for the user-selective retrieval of multimedia data and, together with the response index, are used for deciphering by means of a deciphering algorithm to be used, where a key for the ciphering algorithm is determined for deciphering from the response index in conjunction with the user index and the challenge index.

8. A method according to claim 7, further comprising the following step:

entering a flag index in the definition data block which indicates whether the distributor index, the distributor index and the user index or the challenge index and the response index are to be used in the ciphering.

9. A method according claim 1, further comprising the following step:
entering an expiry index in the definition data block, which indicates when a user's licence to retrieve the multimedia data expires.

10. A method according to claim 1, further comprising the following step:
entering a multimedia index in the definition data block which identifies individual pieces of music according to international standard.

11. A method according to claim 10, further comprising the following step:
entering a user code index in the definition data block which identifies pieces of music which do not have a multimedia index.

12. A method according to claim 1, further comprising the following step:
entering a file index in the definition data block which provides a general description of the multimedia file created by the ciphering method and comprising the definition data block and the multimedia data block.

13. A method according to claim 1, further comprising the following step:
entering a length index in the definition data block which indicates the length of the definition data block.

14. A method according to claim 13, further comprising the following step:
entering an offset index in the definition data block which indicates an offset to a possible further definition data block in the ciphered multimedia file.

15. A method according to claim 1, further comprising the following step:
entering a checksum of the definition data block in the definition data block.

16. A method according to claim 15, further comprising the following step:
ciphering the checksum, the free index, the challenge index and the response index; and
entering the ciphered indexes in the definition data block.

17. A method according to claim 15,
wherein the file index, the length index, the offset index, the ciphering index and the checksum are present in a fixed part of the definition data block, while the block size index, the provider index, the distributor index, the user index, the flag index, the free index, the challenge index, the response index, the expiry index, the multimedia index, and the user code index are located in a variable part of the definition data block.

18. A method according to claim 17,
wherein each entry in the variable part is preceded by an envelope block which specifies the entry following it and the length thereof.

19. A method for deciphering multimedia data contained in a multimedia file having a definition data block and a multimedia data block, the definition data block including a definition data ciphering index, a multimedia data ciphering index, and a free index, the method comprising the following steps:
reading the definition data block;
selecting a definition data deciphering algorithm from a plurality of deciphering algorithms on the basis of the definition data ciphering index;
selecting a multimedia data deciphering algorithm from a plurality of deciphering algorithms on the basis of the multimedia data ciphering index;
deciphering the ciphered section of the definition data block using the definition data deciphering algorithm; and
deciphering the multimedia data block using the selected multimedia data deciphering algorithm,
wherein the step of deciphering the multimedia data block is only continued beyond a specified period of time if the device for deciphering has a setting which is appropriate for the free index.

20. A method according to claim 19 for deciphering multimedia data contained in a multimedia file having a definition data block and a multimedia data block, the definition data block further including an amount index,
wherein only that part of the multimedia data in the multimedia data block is deciphered which is indicated by the amount index.

21. A method according to claim 19 for deciphering multimedia data contained in a multimedia file having a definition data block and a multimedia data block, the definition data block further including a provider index,
wherein the step of deciphering the multimedia data block is only performed if a user is entitled to use products of a provider who is identified by the provider index.

22. A method according to claim 19 for deciphering multimedia data contained in a multimedia file having a definition data block and a multimedia data block, the definition data block further including a distributor index,
wherein the step of deciphering the multimedia data block is only performed if a user is authorized by the distributor specified by the distributor index to use his products.

23. A method according to claim 19 for deciphering multimedia data contained in a multimedia file having a definition data block and a multimedia data block, the definition data block further including a user index,
wherein the step of deciphering the multimedia data block is only performed if the user identified by the user index deciphers the multimedia data.

24. A method according to claim 19 for deciphering multimedia data contained in a multimedia file having a definition data block and a multimedia data block, the definition data block further including a user index, a challenge index and a response index,
wherein the step of deciphering the multimedia data block involves the calculation of a deciphering key required for the selected deciphering algorithm, the key resulting from a combination of the user index, the challenge index and the response index.

25. A device for ciphering multimedia data to obtain a ciphered multimedia file having a definition data block and a multimedia data block, comprising:
means for entering a definition data ciphering index in the definition data block, the definition data ciphering index pointing to a definition data ciphering algorithm to be used for ciphering a section of the definition data block;
means for entering a multimedia data ciphering index in the definition data block, the multimedia data ciphering index pointing to a multimedia data ciphering algorithm to be used for ciphering at least part of the multimedia data block;
means for entering a free index in the definition data block, the free index identifying the device for
deciphering with which the ciphered multimedia data can be deciphered beyond a specified period of time;

means for selecting the definition data ciphering algorithm from a plurality of ciphering algorithms on the basis of the definition data ciphering index;

means for selecting the multimedia data ciphering algorithm from a plurality of ciphering algorithms on the basis of the multimedia data ciphering index;

means for ciphering the section of the definition data block with the definition data ciphering algorithm, the section of the definition data block not including the definition data ciphering index; and means for at least partially ciphering the multimedia data block with the multimedia data ciphering algorithm.

26. A device for ciphering according to claim 25, further comprising:

means for entering a user index, which indicates the user who can use the multimedia data, a challenge index and a response index in the definition data block; and means for calculating the response index from the user index, the challenge index and a key which is specific for an ciphering device.

27. A device for deciphering multimedia data contained in a multimedia file having a definition data block and a multimedia data block, the definition data block including a definition data ciphering index, a multimedia data ciphering index, and a free index, the device comprising:

means for reading the definition data block;

means for selecting a definition data deciphering algorithm from a plurality of deciphering algorithms on the basis of the definition data ciphering index;

means for selecting a multimedia data deciphering algorithm from a plurality of deciphering algorithms on the basis of the multimedia data ciphering index;

means for deciphering the ciphered section of the definition data block using the definition data deciphering algorithm; and means for deciphering the multimedia data block using the selected multimedia data deciphering algorithm, wherein the device for deciphering the multimedia data only continues to decipher the multimedia data block beyond a specified period of time if the device has a setting which is appropriate for the free index.

28. A device for deciphering according to claim 27, further comprising:

means for calculating a key for the selected multimedia data deciphering algorithm from a combination of a user index, a challenge index and a response index, all of which are present in the definition data block.

* * * * *